F. E. BOWERS.
INCUBATOR.
APPLICATION FILED OCT. 13, 1915.

1,177,578.

Patented Mar. 28, 1916.

INVENTOR
Frank E. Bowers,
BY
Hood & Schley
ATTORNEYS

THE COLUMBIA PLANOGRAPH CO., WASHINGTON, D. C.

UNITED STATES PATENT OFFICE.

FRANK E. BOWERS, OF INDIANAPOLIS, INDIANA, ASSIGNOR TO F. M. BOWERS & SONS, A COPARTNERSHIP COMPOSED OF F. M. BOWERS, FRANK E. BOWERS, AND L. A. BOWERS, OF INDIANAPOLIS, INDIANA.

INCUBATOR.

1,177,578. Specification of Letters Patent. Patented Mar. 28, 1916.

Original application filed January 9, 1915, Serial No. 1,306. Divided and this application filed October 13, 1915. Serial No. 55,596.

*To all whom it may concern:*

Be it known that I, FRANK E. BOWERS, a citizen of the United States, residing at Indianapolis, in the county of Marion and State of Indiana, have invented a new and useful Incubator, of which the following is a specification.

My invention relates to incubators in which there is a movable hot water heating element, and its object is to provide for a more uniform heating from this heating element.

This application is a division of my co-pending application Ser. No. 1306, filed Jan. 9, 1915.

The accompanying drawing illustrates my invention.

Figure 1:
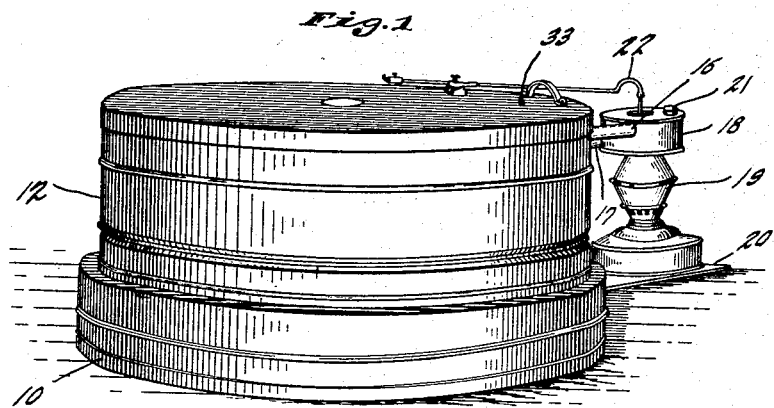
Figure 2:
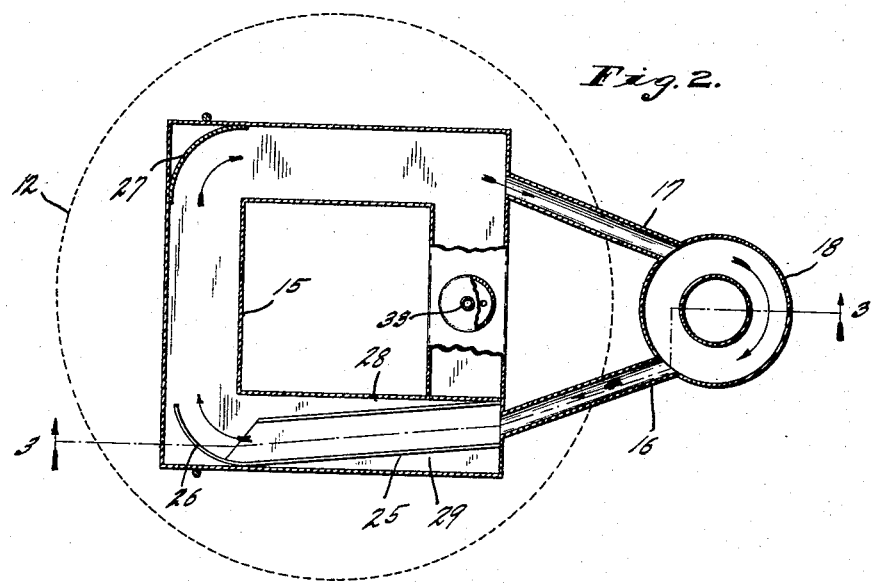
Figure 3:
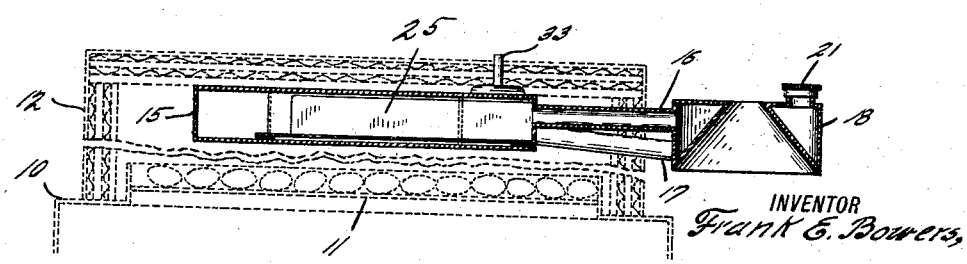

Figure 1 is a perspective view of an incubator embodying my invention; Fig. 2 is a horizontal sectional view through the heating element, showing the parts at the vent opening partly in plan and partly in section on a different plane from the remainder of the figure; and Fig. 3 is a section on the line 3—3 of Fig. 2.

The incubator shown comprises a base 10 for supporting the egg tray 11, and a removable cover 12 which rests on the base 10 and covers the egg tray. This cover is conveniently made of metal with a suitable heat insulating lining, the details of which are immaterial here.

Suitably mounted in the removable cover 12 is a hollow metal frame 15, which is shown in the form of a hollow square, from which frame 15 two pipes 16 and 17 extend at higher and lower levels to a heat-receiving casing 18, which is supported by the pipes 16 and 17 and fits over a suitable heat-producing device, such as a lamp 19 resting on an arm 20 extending from the base 10. The casing 18 is conveniently provided with a filling cap 21, for filling such casing and the interconnected pipes 16 and 17 and the frame 15 with water. These parts are not completely filled, so as to allow room for expansion of the water on heating. On heating the water circulates by gravity from the heat-receiving casing 18 through the pipe 16, around and through the frame 15, and back through the pipe 17 to the heat-receiving casing 18, and the heat is radiated from the frame 15 downward to the eggs in the tray 11. The heating effect may be regulated in any suitable manner, as by an automatic regulator 22 of any desired construction.

For the more uniform distribution of the heat from the frame 15, the pipe 16 discharges into such frame by way of a trough 25 which is located in the receiving side of the square frame 15, this trough being both of less width and less height than the side of the frame in which it is located and being open at the top and preferably very slightly spaced from the frame at the bottom. The water which is discharged into the trough from the pipe 16 in the main travels the length of the trough before striking the walls of the frame 15, and the discharge end of the trough is provided with a curved baffle plate 26 for guiding the water around the corner of the frame 15 with a minimum of eddying. A similar baffle plate 27 may be provided at the next corner of the frame, for similarly guiding the water. The pockets 28 and 29 which are formed between the trough 25 and the walls of the frame 15 contain comparatively still water, which serves to temper the heat which is radiated from that side of the frame 15 to which the hot water from the casing 18 is supplied, these two pockets being interconnected by the narrow space beneath the trough. This heating unit, comprising the parts 15, 16, 17, and 18, is provided with a vent opening of special form, terminating in the pipe 33. This forms no part of the present invention, but is the subject-matter of my aforesaid co-pending application of which the present application is a division.

I claim as my invention:

1. A heating unit for incubators, comprising a hollow, water-containing, radiating frame, a heat-receiving casing, pipes connecting said frame and casing on different levels for providing a water circulation, and a trough located in said frame in position to receive the water discharged thereinto from one of said pipes, said trough extending along said frame and being spaced from the walls thereof at the top, the bottom, and the sides.

2. A heating unit for incubators, comprising a hollow, water-containing, radiating frame, a heat-receiving casing, pipes connecting said frame and casing on different levels for providing a water circulation, and a trough located in said frame in position to receive the water discharged thereinto from one of said pipes, one of the sides of the troughs being extended and curved at its discharge end to form a baffle plate directing the discharge of water from the trough.

In witness whereof, I have hereunto set my hand at Indianapolis, Indiana, this 13th day of September, A. D. one thousand nine hundred and fifteen.

FRANK E. BOWERS.